US010739136B2

(12) United States Patent
Gilomen

(10) Patent No.: US 10,739,136 B2
(45) Date of Patent: Aug. 11, 2020

(54) ASCENT RATE INDICATOR MECHANISM AND DIVER'S WATCH COMPRISING SUCH A MECHANISM

(71) Applicant: Blancpain S.A., Le Brassus (CH)

(72) Inventor: Beat Gilomen, Grenchen (CH)

(73) Assignee: Blancpain S.A., Le Brassus (CH)

(*) Notice: Subject to any disclaimer, the term of this patent is extended or adjusted under 35 U.S.C. 154(b) by 148 days.

(21) Appl. No.: 15/284,746

(22) Filed: Oct. 4, 2016

(65) Prior Publication Data

US 2017/0131097 A1    May 11, 2017

(30) Foreign Application Priority Data

Nov. 11, 2015  (EP) .................................... 15194081

(51) Int. Cl.
*G01C 5/06* (2006.01)
*B63C 11/02* (2006.01)
(Continued)

(52) U.S. Cl.
CPC ................ *G01C 5/06* (2013.01); *B63C 11/02* (2013.01); *G01L 7/104* (2013.01); *G01L 7/12* (2013.01); *G01P 3/62* (2013.01); *G04B 47/066* (2013.01)

(58) Field of Classification Search
CPC . B63C 11/02; G01L 7/104; G01P 3/62; G04B 47/066
See application file for complete search history.

(56) References Cited

U.S. PATENT DOCUMENTS 3,696,610 A * 10/1972 Charbonnier ........... B63C 11/02
                                                                                116/292
3,757,586 A *  9/1973 Borom .................... B63C 11/32
                                                                                73/865.1
(Continued)

FOREIGN PATENT DOCUMENTS

EP          2 104 009 A2    9/2009
WO     WO 2007/121597 A1   11/2007

OTHER PUBLICATIONS

European Search Report dated May 27, 2016 in European Application 15194081, filed on Nov. 11, 2015 (with English Translation of Categories of Cited Documents).

*Primary Examiner* — Tran M. Tran
(74) *Attorney, Agent, or Firm* — Oblon, McClelland, Maier & Neustadt, L.L.P.

(57) ABSTRACT

An ascent rate indicator mechanism includes a first wheel set and a pressure sensor. The first wheel set is connected to the pressure sensor driven in rotation by a pressure variation. The mechanism further includes a second wheel set driven by the first wheel set in a single direction of rotation from a start position into a measurement position corresponding to a decrease in pressure, uncoupling and return structure to be actuated at regular intervals to uncouple the second wheel set and to return it to the start position, an ascent rate display mechanism connected to the second wheel set and including an indicator member arranged to occupy, at each regular interval, a display position representative of the decrease in pressure during the interval, and synchronization structure actuated at each regular interval and arranged to maintain the display position of the indicator member during the regular interval.

12 Claims, 2 Drawing Sheets

(51) Int. Cl.
*G04B 47/06* (2006.01)
*G01P 3/62* (2006.01)
*G01L 7/10* (2006.01)
*G01L 7/12* (2006.01)

(56) References Cited

U.S. PATENT DOCUMENTS

| | | | | | |
|---|---|---|---|---|---|
| 3,759,101 | A | * | 9/1973 | Borom | B63C 11/32 73/291 |
| 3,872,731 | A | * | 3/1975 | Borom | B63C 11/32 73/865.1 |
| 3,885,430 | A | * | 5/1975 | Greene | G01P 3/62 73/179 |
| 3,910,117 | A | * | 10/1975 | Wicklund | G04B 47/066 73/291 |
| 3,992,949 | A | * | 11/1976 | Edmondson | B63C 11/32 368/10 |
| 4,056,010 | A | * | 11/1977 | Alinari | B63C 11/32 73/300 |
| 4,107,995 | A | * | 8/1978 | Ligman | B63C 11/32 73/300 |
| 4,109,140 | A | * | 8/1978 | Etra | B63C 11/32 368/1 |
| 4,188,825 | A | * | 2/1980 | Farrar | B63C 11/32 368/1 |
| 4,327,584 | A | * | 5/1982 | Alinari | G01F 23/14 73/300 |
| 4,589,283 | A | * | 5/1986 | Morrison, Jr. | B63C 11/32 73/300 |
| 4,783,772 | A | * | 11/1988 | Umemoto | B63C 11/02 368/11 |
| 4,820,953 | A | * | 4/1989 | Saubolle | B06B 1/0666 310/319 |
| 5,156,055 | A | * | 10/1992 | Hollis | B63C 11/02 73/865.1 |
| 5,251,190 | A | * | 10/1993 | Miyasaka | G04G 21/02 368/10 |
| 5,308,272 | A | * | 5/1994 | Thurlow | B63C 11/02 405/186 |
| 5,583,830 | A | * | 12/1996 | Okuyama | B63C 11/02 368/11 |
| 5,802,016 | A | * | 9/1998 | Kubota | G04C 3/008 368/11 |
| 6,321,177 | B1 | * | 11/2001 | Ferrero | B63C 11/02 324/115 |
| 6,385,134 | B1 | * | 5/2002 | Lange | G01L 19/16 368/11 |
| 6,490,230 | B1 | * | 12/2002 | Sakuyama | G04C 3/14 368/11 |
| 6,842,402 | B2 | * | 1/2005 | Germiquet | G04G 21/02 368/10 |
| 6,901,033 | B2 | * | 5/2005 | Ito | G04C 3/008 368/204 |
| 7,123,549 | B2 | * | 10/2006 | Robert | G04G 21/02 368/11 |
| 7,158,449 | B2 | * | 1/2007 | Fujimori | G04C 3/008 368/160 |
| 7,269,100 | B2 | * | 9/2007 | Gilomen | G04C 3/146 368/11 |
| 7,474,981 | B2 | * | 1/2009 | Goldman | B63C 11/02 702/138 |
| 7,627,446 | B2 | * | 12/2009 | Hirose | B63C 11/02 702/139 |
| 7,778,115 | B2 | * | 8/2010 | Ruchonnet | G01L 7/163 368/101 |
| 7,869,308 | B2 | * | 1/2011 | Rochat | B63C 11/02 368/101 |
| 8,952,820 | B2 | * | 2/2015 | Juergensen | B63C 11/02 340/626 |
| 2009/0185451 | A1 | | 7/2009 | Rochat | |
| 2010/0302054 | A1 | * | 12/2010 | Metzler | B63C 11/02 340/815.4 |
| 2015/0168438 | A1 | * | 6/2015 | Tsubata | G01P 3/62 702/144 |

* cited by examiner

ASCENT RATE INDICATOR MECHANISM AND DIVER'S WATCH COMPRISING SUCH A MECHANISM

This application claims priority from European Patent Application No. 15194081.4 filed on Nov. 11, 2015, the entire disclosure of which is incorporated hereby by reference.

FIELD OF THE INVENTION

The present invention concerns an ascent rate indicator mechanism and more particularly such a mechanism comprising a first wheel set and a pressure sensor arranged to deform mechanically under the effect of a pressure variation in the surrounding medium, the first wheel set being kinematically connected to the pressure sensor so as to be driven in rotation in the event of a pressure variation. The present invention also concerns a diver's watch comprising an ascent rate indicator mechanism.

BACKGROUND OF THE INVENTION

A diver must know various parameters when he makes an underwater dive in order to ensure his safety. In particular, the diver must instantaneously know the depth at which he is located to avoid the risk of exceeding a pre-established maximum dive depth. The diver must also know his dive time to avoid exhausting his oxygen reserves and in order to ascend to the surface safely. Two other important parameters concern decompression. These parameters are the rate of ascent and the length of any decompression stops. It is of vital importance to know the ascent rate. Indeed, if the diver ascends too quickly, he is at risk of a fatal embolism. The recommended maximum ascent rate is generally 10 m/minute.

CH Patent 513456 discloses a watch provided with mechanisms for indicating the instantaneous depth, immersion time and the minimum length of a decompression stop that the diver might need to observe five metres below the surface. It is noted however that the watch disclosed in this prior art document does not comprise an ascent rate indicator mechanism.

U.S. Pat. No. 3,910,117 discloses a device intended to enable a diver to check his ascent rate. However, this device is not fitted with an ascent rate indicator mechanism. The device disclosed in this prior art document comprises two concentric hands, one intended to indicate the instantaneous depth and the other to simulate the change in depth during a model ascent. Before ascending, the diver makes an adjustment to superpose the two hands. Then, at the moment of starting the ascent, he starts the simulation. During the ascent, the diver constantly checks that the two hands are still superposed, so that his ascent rate is based on that of the model to be followed. One drawback of this prior art device is that it is not possible to change the ascent rate.

SUMMARY OF THE INVENTION

It is an object of the invention to overcome the drawbacks of the various known mechanisms.

More specifically, it is an object of the invention to provide an ascent rate indicator mechanism that enables a diver to know his ascent rate in order to adjust it if it exceeds the recommended maximum ascent rate.

To this end, the present invention concerns an ascent rate indicator mechanism comprising a first wheel set and a pressure sensor arranged to deform mechanically under the effect of a pressure variation in the surrounding medium, the first wheel set being kinematically connected to the pressure sensor so as to be driven in rotation in the event of a pressure variation.

According to the invention, said mechanism further comprises a second wheel set arranged to be driven by the first wheel set in a single direction of rotation from a start position into a measurement position corresponding to the decrease in pressure, uncoupling and return means arranged to be actuated at regular intervals to uncouple the second wheel set and to return it to the start position, an ascent rate display mechanism kinematically connected to the second wheel set and comprising an indicator member arranged to occupy, at each regular interval, a display position representative of the decrease in pressure during said interval and thus of the ascent rate, and synchronization means actuated at said regular intervals and arranged to maintain said display position of the indicator member during said regular interval.

The present invention also concerns a diver's watch comprising a mechanical or electromechanical movement, and an ascent rate indicator mechanism as defined above, the uncoupling and return means and the synchronization means being arranged to be actuated by the movement at said regular intervals.

The mechanism according to the invention allows a diver to know, at each regular interval, his mean ascent rate measured during said interval.

BRIEF DESCRIPTION OF THE DRAWINGS

Other features and advantages of the invention will appear upon reading the following description, given solely by way of non-limiting example, with reference to the annexed drawings, in which.

DETAILED DESCRIPTION OF A PREFERRED EMBODIMENT

Figure 1:
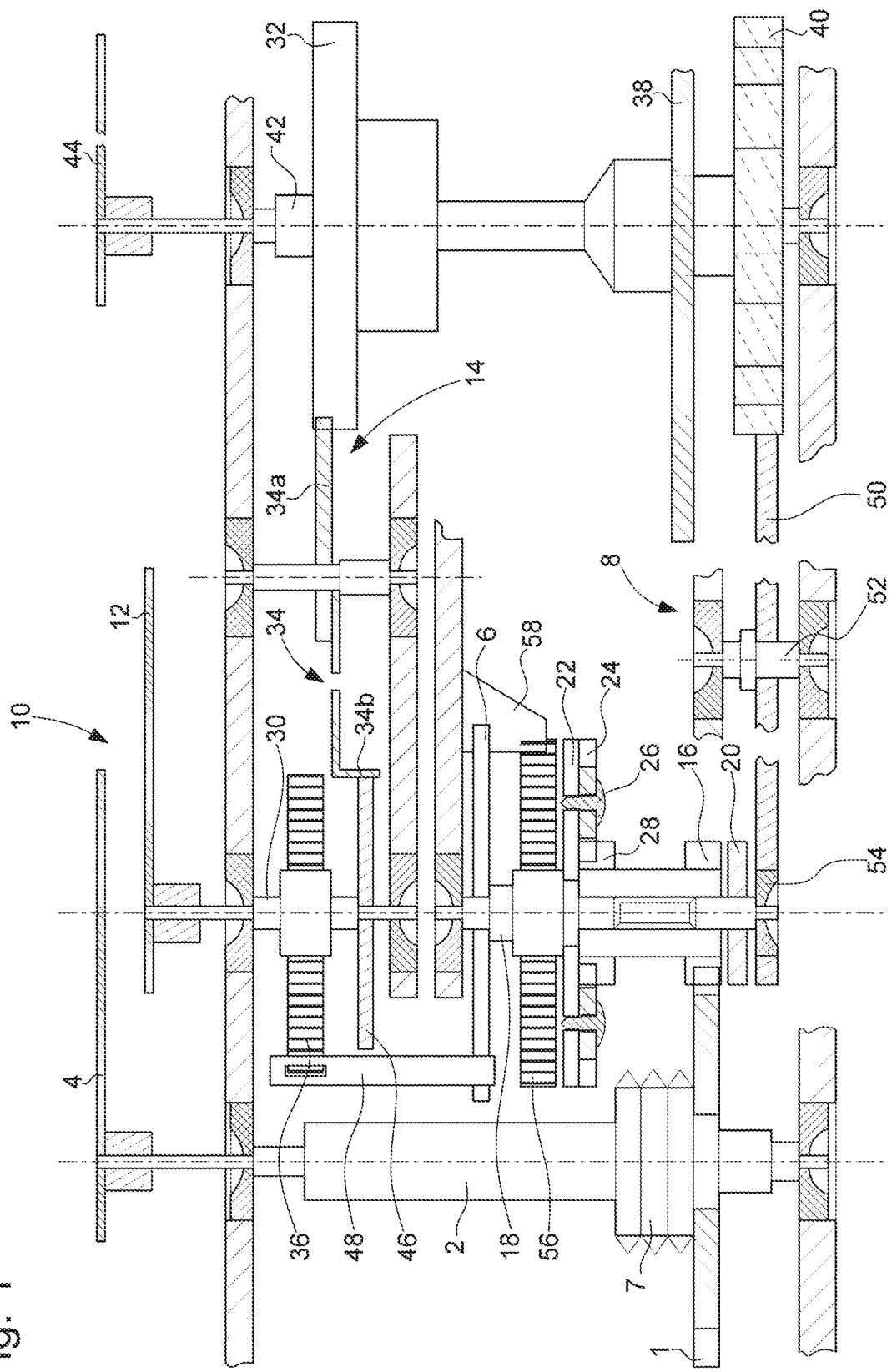
FIG. 1 is a schematic cross-sectional view of an ascent rate indicator mechanism according to the invention.

Referring to FIG. 1, the ascent rate indicator mechanism according to the invention comprises a first wheel set 1 integral with an arbor 2 mounted to pivot on the frame and kinematically connected to a pressure sensor 7 arranged to deform mechanically under the effect of pressure variation in the surrounding medium, such as an aneroid capsule. Such a sensor comprises an aneroid box. During the diver's descent, the pressure increases and the aneroid box is compressed. If the diver ascends, the pressure decreases and the aneroid box expands again. These deformations are measured and transformed into a motion which may be linear, logarithmic or other, amplified by a gear train. A travel "s" is thus obtained as a function of the difference in depth. The watch comprises a movement for measuring time t. Since the rate is defined by vertical travel s divided by time t (v=s/t), the diver's ascent rate is obtained by displaying, at constant and regular intervals, a value corresponding to the vertical travel s of the diver during said regular time interval. This regular time interval may be 5 seconds, for example. It is evident that a different time interval may be chosen by the watch designer.

The pressure sensor is arranged such that the travels d of the aneroid capsule reach arbor 2 in the form of an angular displacement as a function of pressure variation due to the difference in depth during the diver's ascent. Thus, first wheel set 1 is driven in rotation by arbor 2 when pressure varies.

Arbor 2 may also carry a depth display hand 4.

According to the invention, the ascent rate indicator mechanism further comprises a second wheel set 6 arranged to be driven by first wheel set 1 in a single direction of rotation from a start position (v=0, v=ascent rate) into a measurement position corresponding to the variation (decrease) in pressure, uncoupling and return means 8 arranged to be actuated at regular intervals to uncouple second wheel set 6 and return it to the start position, a mechanism 10 for displaying ascent rate v, kinematically connected to second wheel set 6 and comprising an indicator mechanism 12 arranged to occupy, at each regular interval, a display position representative of the variation (decrease) in pressure during said interval and thus of the ascent rate, and synchronization means 14 actuated at each regular interval and arranged to maintain said display position of indicator member 12 during said regular interval.

The mechanism also comprises a pinion 16 mounted on an arbor 18 mounted to pivot on the frame and carrying second wheel set 6. Said pinion 16 is arranged to cooperate with first wheel set 1, second wheel set 6 and said pinion 16 being coupled by a one-directional coupling. More specifically, pinion 16 is freely mounted on arbor 18 and is held up by a washer 20. Pinion 16 and arbor 18 are arranged such that pinion 16 forms a sliding pinion controlled by uncoupling and return means 8 to move out of mesh with first wheel set 1 when said means 8 are actuated, as will be described below. The one-directional coupling between second wheel set 6 and pinion 16 is achieved by means of a click wheel 22 integral with arbor 18. To this end, clicks 24 secured by means of arbors 26 on wheel 22 transmit the rotation of a pinion 28 integral with pinion 16 to wheel 22, which will then turn, only when the pressure measured by the pressure sensor decreases. When the pressure increases, clicks 24 allow pinion 28, and therefore pinion 16, to turn freely, so that the rotation of pinion 16 and thus of first wheel set 1 is not transmitted to click wheel 22, which remains immobile. As click wheel 22 is integral with second wheel set 6, the rotation of first wheel set 1 is only transmitted to second wheel set 6 when the pressure measured by the pressure sensor decreases, and therefore when the diver ascends. When the pressure measured by the pressure sensor increases (the diver descends), second wheel set 6 is not driven.

Ascent rate display mechanism 10 comprises an arbor 30 mounted to pivot on the frame, coaxially to arbor 18. Arbor 30 carries indicator member 12.

Synchronization means 14 comprise a first control element 32 which is synchronized with means 8 for uncoupling and returning second wheel set 6 to be actuated at each regular interval. More particularly, first control element 32 is formed of a cam, coaxial and integral with a fourth wheel 38 of the movement, and arranged to be actuated at each regular interval. For example, cam 32 comprises teeth arranged to cooperate with brake 34, with the number of teeth being selected as a function of the length of the selected ascent rate measurement interval selected. In particular, for a 5 second interval, cam 32 comprises 12 teeth. To ensure synchronization with uncoupling and return means 8, first control element 32 and fourth wheel 38 are integral with a second control element 40 arranged to actuate uncoupling and return means 8 at the same regular intervals, as will be described below. To this end, second control element 40 is formed of a cam, coaxial and integral with a fourth wheel 38 of the movement, and arranged to be actuated at each regular interval. For example, cam 40 comprises teeth arranged to cooperate with uncoupling and return means 8, with the number of teeth being selected as a function of the length of the selected ascent rate measurement interval. In particular, for a 5 second interval, cam 40 also comprises 12 teeth. First control element 32 and second control element 40 and fourth wheel 38 are integral with an arbor 42 mounted to pivot on the frame and carrying seconds hand 44.

Synchronization means 14 also comprise a brake 34 which is arranged to lock indicator member 12 in its display position during said time interval and controlled by said first control element 32 to move out of mesh at said regular intervals. Brake 34 comprises a body 34a arranged to cooperate with first control element 32 and in particular to be raised at each passage of one of its teeth. The end 34b of brake 34 is arranged to retain a disc 46 integral with arbor 30 which carries indicator member 12.

Synchronization means 14 also comprise a first member 36 for returning indicator member 12 kinematically connected to second wheel set 6 and arranged to move indicator member 12, when brake 34 is disengaged at each regular interval, into the display position corresponding to the measurement position of second wheel set 6 during said interval. In the variant represented, first return member 36 is a spring. In another variant (not represented), the first return member may be a heart-piece arranged to create a return to zero torque under the effect of a hammer permanently held in abutment by means of a spring acting on said hammer. Indicator member 12 is kinematically connected to second wheel set 6 by means for driving indicator member 12 carried by said second wheel set 6. These means for driving indicator member 12 are formed more particularly by a pin 48 integral with second wheel set 6 on the one hand and with first return member 36 on the other. Thus, in the variant represented, one end of first return spring 36 is fixed to pin 48 and the other end is fixed to arbor 30.

Uncoupling and return means 8 comprise second control element 40 arranged to be actuated at each regular interval. They also comprise an uncoupling lever 50 carrying pinion 16 and controlled by second control element 40 to pivot at each regular interval. More precisely, uncoupling lever 50 is mounted to pivot on the frame about its arbor 52. At one end thereof, uncoupling lever 50 carries a bearing 54 which carries sliding pinion 16. This mechanism allows sliding pinion 16 to move out of mesh with first wheel set 1 when the uncoupling lever is actuated. At the other end thereof, uncoupling lever 50 is controlled by the teeth arranged on second control element 40 to be actuated and to pivot at said regular intervals. It comprises a return spring (not represented) to return said uncoupling lever back into position.

Uncoupling and return means 8 also comprise a second return member 56 arranged to return second wheel set 6 to the start position when uncoupling and return means 8 are actuated at each regular interval. In the variant represented, second return member 56 is a spring. In another variant (not represented), the second return member may be a heart-piece arranged to create a return to zero torque under the effect of a hammer permanently held in abutment by means of a spring acting on said hammer. In the variant represented, second return spring 56 has one end fixed to arbor 18 and one end fixed to the frame, for example a bridge 58. Further, bridge 58 is arranged to form a stop for second wheel set 6 when the latter is returned to its start position under the action of second return member 56.

The mechanism of the invention operates as follows: when the diver moves vertically underwater, the aneroid capsule transmits the diver's movements to arbor 2. First wheel set 1, and pinions 16 and 28 are thus driven in rotation as a function of the movement. If the diver's movement is in the direction of increased pressure (the dive depth is increasing), clicks 24 do not transmit this movement to wheel 22. If the diver's movement is in the direction of decreased pressure (the diver is ascending and the dive depth is decreasing), wheel 22 is driven in rotation and clicks 24 allow the movement to be transmitted from pinion 16 to said wheel 22. Arbor 18 integral with wheel 22 is then driven in rotation at an angle that is a function of the vertical travel of the diver. Second wheel set 6, integral with the arbor, pin 48 and the end of first spring 36 attached thereto, are driven in rotation at the same angle, corresponding to the measurement position of second wheel set 6. End 34b of brake 34 holds disc 46 in opposition to the torque of first return spring 36, such that arbor 30 and indicator member 12 remain immobile during the regular interval, for example 5 seconds. Body 34a of brake 34 is bearing on first control mechanism 32 driven by seconds arbor 42 and comprising 12 teeth for actuating brake 34 at each regular interval, namely every 5 seconds. When brake 34 is actuated by first control element 32, it releases disc 46. Under the effect of first return spring 36, arbor 30 and indicator member 12 are moved and repositioned with respect to the position of pin 48. Indicator member 12 has thus pivoted by the angle that is a function of the movement of the diver during the regular interval that has just passed, namely the preceding five seconds. After the passage of the tooth of first control mechanism 32, brake 34 returns to its position, with end 34b again locking disc 46 and therefore indicator member 12. Said indicator member 12 is then in its display position for displaying, during a regular interval, namely 5 seconds, the ascent rate corresponding to the diver's movement during the preceding regular interval, i.e. the preceding five seconds here. Thus, indicator member 12 maintains the ascent rate display for a duration corresponding to the regular interval, i.e. five seconds here, which allows the driver to read this information comfortably.

At the moment when brake 34 bears on disc 46 again, a tooth of the second control element 40 passes before uncoupling lever 50 and causes it to pivot partially about its arbor 52. Bearing 54 carried by lever 50 moves and the toothing of sliding pinion 16 is moved out of mesh with first wheel set 1. Under the action of the second return spring 56, arbor 18 is moved back, causing second wheel set 6 to bear against bridge 58, so that second wheel set 6 returns to its start position. Second wheel set 6 also returns pin 48 and the end of first return spring 36 to their start position, creating a negative torque of said first return spring 36. Once the tooth of second control element 40 has passed, uncoupling lever 50 drops back into its initial position, returned by its return spring, and sliding pinion 16 meshes again with first wheel set 1. The mechanism starts again in the same manner, with indicator member 12 making a jump every five seconds to display, for five seconds, the ascent rate corresponding to the vertical movement of the driver during the preceding five seconds. The jump will be forwards if the ascent rate has increased, or backwards if the ascent rate has decreased, due to the greater or lesser torque of first return spring 36.

First and second control elements 32 and 40 are integral with the same seconds arbor 42, allowing synchronization of the ascent rate display mechanism with the means for uncoupling and returning the second wheel set. However, said first and second control elements are arranged to be staggered by several tenths of a second, such that brake 34 is actuated and repositioned several tenths of a second (typically 0.1 to 0.4 s) prior to the uncoupling and return of second wheel set 6.

The regular time interval may be, for example, 5 seconds. Consequently, the mechanism according to the invention makes it possible to refresh the ascent rate measurement every 5 seconds, which is a good compromise between the desired precision and the required information refresh speed. A different time interval may be chosen by adjusting the number of teeth provided on the cams.

Figure 2:
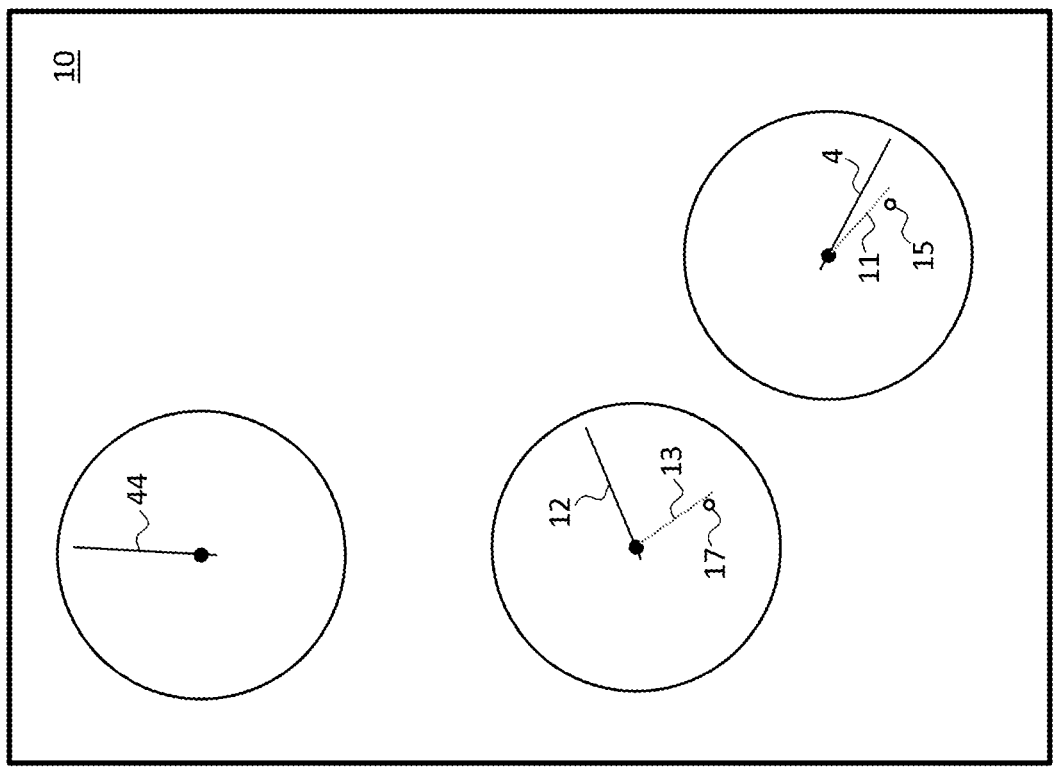
FIG. 2 is a front view of an ascent rate indicator mechanism according to an embodiment of the present application.

FIG. 2 shows a front view of an ascent rate indicator mechanism according to an embodiment of the present application. The mechanism 10 for displaying the ascent rate may include analog display methods showing the display hands 4, 12, and 44, each hand representing different aspects of a user's ascent/descent. Specifically, a depth display hand 4, an ascent rate indicator member 12, and a seconds hand 44. The mechanism 10 may further include other mechanisms. For example, it is possible to provide an alarm for warning the diver when his ascent rate is too fast. This alarm may take the form of an alarm sound, a vibration, a light or a combination of such possibilities. For example, a first striking mechanism 17 may be associated with the ascent rate indicator mechanism. The first striking mechanism 17 may include an alarm arranged to be released if the diver's rate exceeds a maximum allowed threshold of 10 m/minutes, and thus if second wheel set 6 travels through an angle of rotation corresponding to this maximum allowed rate and reaches a position in which it triggers an alarm. For example, a finger may be provided on second wheel set 6, projecting therefrom to release an alarm mechanism if the finger exceeds an angle which, on indicator member 12, corresponds to a maximum allowed rate of 10 m/minute.

It is also possible to provide a mechanism for displaying the maximum depth reached and the maximum ascent rate. For the maximum depth reached, it is possible to provide a fly-back type hand on arbor 2 carrying depth display hand 4, said maximum depth display hand 11 being pushed by depth display hand 4 and remaining at the maximum position to which it was brought by depth display hand 4. A second striking mechanism 15 is associated with the mechanism displaying the maximum depth reached, arranged to be released if the depth exceeds a maximum allowed threshold. Likewise, for the maximum ascent rate, it is possible to provide a fly-back type hand on arbor 30 carrying the ascent rate indicator member 12, said maximum ascent rate display hand 13 being pushed by said indicator member 12 and remaining at the maximum position to which it was brought by indicator member 12. These hands displaying the maximum depth reached and maximum ascent rate are mourned with slight friction and returned to zero by means of two push-pieces.

It is also possible to provide a release mechanism for measuring the dive time. This mechanism may, for example, comprise a pin provided on first wheel set 1 and arranged to release a dive minute counter. Thus, when the dive has started, first wheel set 1 pivots, driving the pin which is arranged to release the minute counter, for example when the diver has travelled one meter in depth. When the diver ascends and reaches a depth of one metre, the pin is arranged to stop the minute counter. Thus, the diver knows his dive time, without having to perform initial settings before diving.

It is also possible to provide a mechanism for coupling second wheel set 6 to pinion 16, arranged to couple said second wheel set to said pinion on demand, the zero position then being defined by the rest (relaxed) position of the return spring. This design provides a display of both the descent and ascent rate of the diver.

What is claimed is:

1. An ascent rate indicator mechanism comprising:
a first wheel set and a pressure sensor, the pressure sensor configured to deform mechanically under a pressure variation in a surrounding medium and configured to actuate the first wheel set based on the pressure variation,
a second wheel set driven by the first wheel set in a single direction of rotation, the second wheel set configured to rotate from a start position into a measurement position corresponding to an ascension rate representing a rate of decrease in pressure measured by the pressure sensor over a period of time,
an uncoupling and returning mechanism configured to reset the second wheel set by uncoupling the second wheel set from the first wheel set and configured to return the second wheel set to the start position at an end of said period of time,
wherein the second wheel set is configured to rotate an ascent rate indicator to a position representative of the rate of decrease in pressure measured by the pressure sensor over the period of time,
a first return mechanism to return the ascent rate indicator to the start position,
wherein the ascent rate indicator rotates in a first direction to indicate an increase in the ascension rate and rotates in a second direction opposite to the first direction to indicate a decrease in the ascension rate the rotations in the first direction and the second direction are respectively caused by an increase or a decrease of torque in the first return mechanism, and
a synchronizer configured maintain said position of the ascent rate indicator during said period of time.

2. The ascent rate indicator mechanism according to claim 1, wherein the synchronizer comprises:
a first controller synchronized with the uncoupling and returning mechanism,
a brake to lock the ascent rate indicator in said position during said period of time and controlled by said first controller to disengage the brake at the end of said period of time.

3. The ascent rate indicator mechanism according to claim 1, wherein the second wheel set is configured to drive the ascent rate indicator.

4. The ascent rate indicator mechanism according to claim 2, wherein the ascent rate indicator is driven by at least a pin, integral with the second wheel set and with the first return mechanism.

5. The ascent rate indicator mechanism according to claim 1, further comprising:
a pinion, mounted on an arbor carrying the second wheel set, said pinion actuated with the first wheel set, and the second wheel set and said pinion are coupled with a unidirectional coupling.

6. The ascent rate indicator mechanism according to claim 5, wherein said pinion is a sliding pinion and the uncoupling and returning mechanism moves said pinion out of mesh with the first wheel set.

7. The ascent rate indicator mechanism according to claim 5, wherein the uncoupling and returning mechanism comprises:
a second control mechanism configured to actuate at the end of said period of time, said second control mechanism pivoting a lever carrying said pinion to move said pinion out of mesh with the first wheel set at the end of said period of time, and
a second return mechanism configured to return the second wheel set to the start position when the uncoupling and returning mechanism is actuated at the end of said period of time.

8. The ascent rate indicator mechanism according to claim 1, wherein the pressure sensor is an aneroid capsule.

9. A diver's watch comprising a mechanical or electromechanical movement, and an ascent rate indicator mechanism comprising:
a first wheel set and a pressure sensor, the pressure sensor configured to deform mechanically under a pressure variation in a surrounding medium and configured to actuate the first wheel set based on the pressure variation,
a second wheel set driven by the first wheel set in a single direction of rotation, the second wheel set configured to rotate from a start position into a measurement position corresponding to an ascension rate representing a rate of decrease in pressure measured by the pressure sensor over a period of time,
an uncoupling and returning mechanism configured to reset the second wheel set by uncoupling the second wheel set from the first wheel set and configured to return the second wheel set to the start position at an end of said period of time,
wherein the second wheel set is configured to rotate an ascent rate indicator to a position representative of the rate of decrease in pressure measured by the pressure sensor over the period of time,
a first return mechanism to return the ascent rate indicator to the start position,
wherein the ascent rate indicator rotates in a first direction to indicate an increase in the ascension rate and rotates in a second direction opposite to the first direction to indicate a decrease in the ascension rate, the rotations in the first direction and the second direction are respectively caused by an increase or a decrease of torque in the first return mechanism, and
a synchronizer configured to maintain said position of the ascent rate indicator during said period of time.

10. The diver's watch according to claim 9, wherein the synchronizer and the uncoupling and returning mechanism respectively comprises a first and a second control mechanism, the first and second control mechanism each including a cam that is coaxial, integral with a third wheel of the movement and arranged to be actuated.

11. The diver's watch according to claim 9, wherein the diver's watch comprises a first striking mechanism associated with the ascent rate indicator, said first striking mechanism comprising an alarm configured to, when the ascent rate indicator triggers the first striking mechanism, indicate that a diver's ascension rate exceeds a maximum allowed threshold.

12. The diver's watch according to claim 9, wherein the diver's watch comprises a max depth mechanism to display a maximum depth reached, the max depth mechanism associated with a second striking mechanism comprising an alarm configured to, when a depth indicator actuated by the first wheel set triggers the second striking mechanism, notify a diver when the diver's depth exceeds a maximum allowed threshold.

* * * * *